US012183568B2

(12) United States Patent
Kobayashi et al.

(10) Patent No.: US 12,183,568 B2
(45) Date of Patent: Dec. 31, 2024

(54) EXCIMER LAMP AND UV IRRADIATION UNIT INCLUDING THE SAME

(71) Applicant: ORC MANUFACTURING CO., LTD., Tokyo (JP)

(72) Inventors: Go Kobayashi, Nagano (JP); Izumi Serizawa, Nagano (JP); Shunya Matsushima, Nagano (JP)

(73) Assignee: ORC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/612,358

(22) Filed: Mar. 21, 2024

(65) Prior Publication Data

US 2024/0321567 A1 Sep. 26, 2024

(30) Foreign Application Priority Data

| | | |
|---|---|---|
| Mar. 23, 2023 | (JP) | 2023-047045 |
| Mar. 23, 2023 | (JP) | 2023-047051 |
| Mar. 23, 2023 | (JP) | 2023-047152 |
| Jul. 21, 2023 | (JP) | 2023-118998 |
| Jul. 21, 2023 | (JP) | 2023-119080 |

(51) Int. Cl.
*H01J 61/16* (2006.01)
*H01J 61/06* (2006.01)

(52) U.S. Cl.
CPC .............. *H01J 61/06* (2013.01); *H01J 61/16* (2013.01)

(58) Field of Classification Search
CPC ................................ H01J 61/06; H01J 61/16
USPC ........................................................ 313/634
See application file for complete search history.

(56) References Cited

U.S. PATENT DOCUMENTS

| | | | | |
|---|---|---|---|---|
| 2008/0258601 | A1* | 10/2008 | Justel | H01J 61/06 313/643 |
| 2022/0020581 | A1* | 1/2022 | Yoon | H01J 65/00 |
| 2022/0125963 | A1* | 4/2022 | Choi | A61L 2/22 |
| 2023/0302172 | A1* | 9/2023 | Ohashi | A61L 2/10 |

FOREIGN PATENT DOCUMENTS

| | | |
|---|---|---|
| EP | 2608245 | 6/2013 |
| JP | 7-272692 | 10/1995 |
| JP | 11-283579 | 10/1999 |
| JP | 5504095 | 5/2014 |
| JP | 6557011 | 8/2019 |

* cited by examiner

*Primary Examiner* — Christopher M Raabe

(74) *Attorney, Agent, or Firm* — Greenblum & Bernstein, P.L.C.

(57) ABSTRACT

An excimer lamp includes a discharge tube, a band-shaped foil electrode provided in the discharge tube, and a dielectric configured to cover the foil electrode and maintain close contact with the foil electrode. The foil electrode extends along the axis of said discharge tube. The opposite sides of the foil electrode are flattened along the width direction of the foil electrode. Both edge portions of the foil electrode are pointed.

18 Claims, 9 Drawing Sheets

EXCIMER LAMP AND UV IRRADIATION UNIT INCLUDING THE SAME

BACKGROUND OF THE INVENTION

1. Field of the Invention

The present invention relates to an excimer lamp that radiates ultraviolet light by emission of excimer molecules, and a UV (Ultraviolet) irradiation unit with an excimer lamp.

2. Description of the Related Art

In an excimer lamp, a discharge gas is sealed in a discharge tube and oppositely charged electrodes are arranged along the axis of the discharge tube. A discharge for emitting ultraviolet light occurs by applying voltage (e.g., several kilovolts) between the electrodes.

For example, in a dual cylinder tubular-type excimer lamp, an interior tube and an exterior tube that extend along the axis of the lamp, respectively, are coaxially arranged and these cylindrical coaxial tubes form a light-emitting portion of the lamp. A discharge gas such as a xenon gas or a mixture of a xenon gas and a halogen gas is sealed in a discharge space formed by welding the interior tube to the exterior tube.

For example, an inner electrode is covered with the interior tube or embedded in the tube wall of the interior tube, whereas an outer electrode is arranged on or near the outer surface of the exterior tube. Excimer light is generated by applying high-frequency voltage between the inner electrode and the outer electrode.

Typically, the excimer lamp emits ultraviolet light radially from the discharge tube, i.e., light is irradiated from the entire lengthwise circumference of the discharge tube. On the other hand, a spot-irradiation type excimer lamp emits ultraviolet light from the tip portion of the discharge tube. The outer surface of the discharge tube in the spot-irradiation type configuration is covered with a filmy or membranous outer surface such as aluminum film. Also, a line-irradiation type excimer lamp irradiates ultraviolet light in a line. A discharge tube in the line-irradiation type configuration is partially covered with a reflective filmy or membranous electrode such as an aluminum film, and the remaining uncovered portion of the outer surface that extends in a line along the axis of the tube is the transparent portion through which ultraviolet light is transmitted.

In the case of an extremely small sized excimer lamp (hereinafter, "micro excimer lamp"), the form or construction of a discharge tube and electrodes is restricted. For example, the outer diameter of the discharge tube is set to be equal or less than 30 mm. The applied voltage is restricted in accordance to the size of an excimer lamp.

To improve lighting responsiveness while suppressing an applied voltage, an electrode provided in a discharge tube is shaped like the blade of a knife. EP 2608245A1 discloses a micro excimer lamp, in which the edge portion of a foil electrode is knife-edge shaped. The foil electrode is covered with or embedded in a cylindrical dielectric corresponding to an interior tube and becomes gradually sharper from the center portion toward a tip along the width of the electrode.

To emit ultraviolet light from a micro excimer lamp effectively, a discharge space formed in a discharge tube should be sufficiently wide and expand as soon as possible, which requires a minimization of the size (diameter) and the thickness of the interior tube, i.e., the dielectric. However, in this configuration, it is difficult to have the inner electrode in close contact with the dielectric. There is possibility that the inner electrode could peel off the dielectric.

SUMMARY OF THE INVENTION

The present invention is an improvement of a miniaturized or downsized excimer lamp.

An excimer lamp includes a discharge tube, a band-shaped foil electrode provided in the discharge tube, and a dielectric configured to cover the foil electrode and maintain close contact with the foil electrode. The foil electrode extends along the axis of the discharge tube. The opposite sides of the foil electrode are flattened along the width direction of the foil electrode. Both edge portions of the foil electrode are pointed.

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENTS

Hereinafter, the preferred embodiment of the present invention is described with references to the attached drawings.

Figure 1:
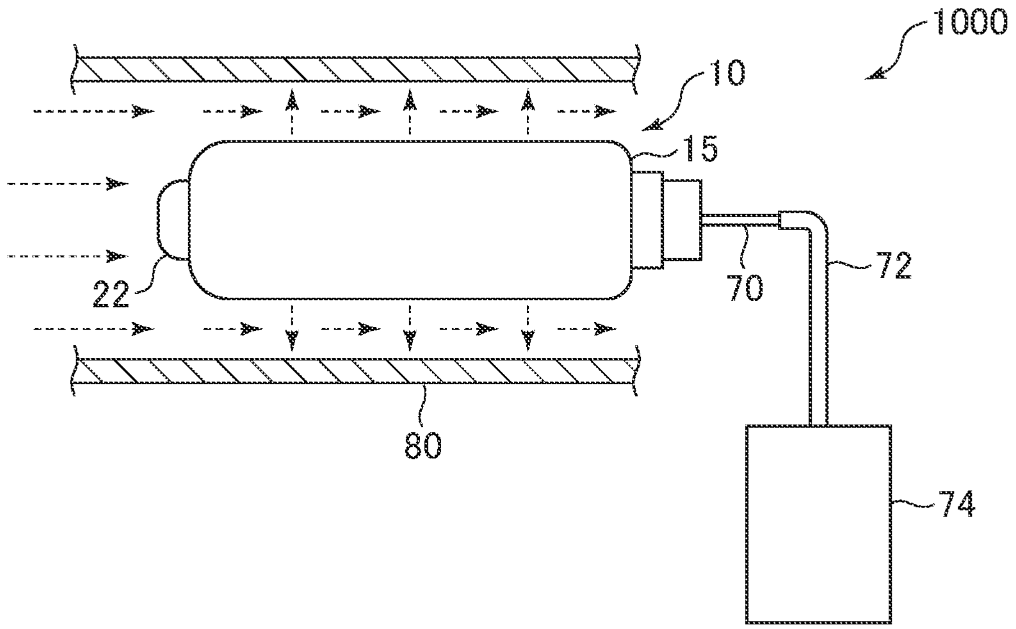
FIG. 1 is a schematic view showing a UV irradiation unit according to a first embodiment.

FIG. 1 is a schematic view showing a UV irradiation unit 1000 according to the first embodiment.

The UV irradiation unit 1000 is equipped with an excimer lamp 10 and an electric power supplier 74. The excimer lamp 10 is connected to the electric power supplier 74 via a power cable 72. The excimer lamp 10 is arranged in a fluid tube 80. Herein, a gas such as air flows around the excimer lamp 10.

The excimer lamp 10 emits ultraviolet light towards the gas when the excimer lamp 10 is powered ON with electric power from the electric power supplier 74 so that ozone is generated. The gas including the generated ozone flows outward from the fluid tube 80. The UV irradiation unit 1000 is a module-type unit, which may be incorporated into an ozonizing unit, a deodorizing unit, and so on. The excimer lamp 10 may be arranged in the flow of liquid to be irradiated.

Figure 2:
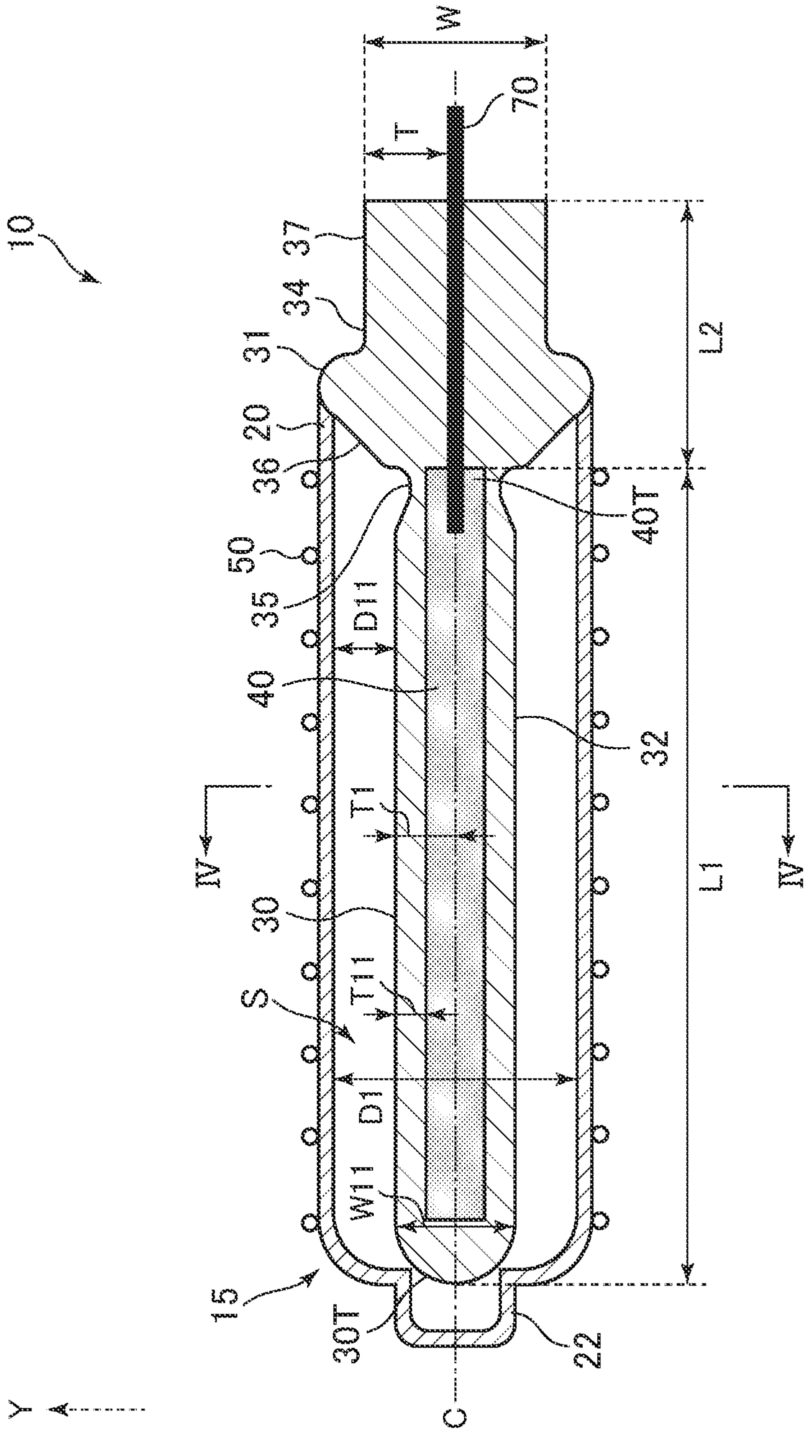
FIG. 2 is a cross-sectional view of an excimer according to the first embodiment.
Figure 3:
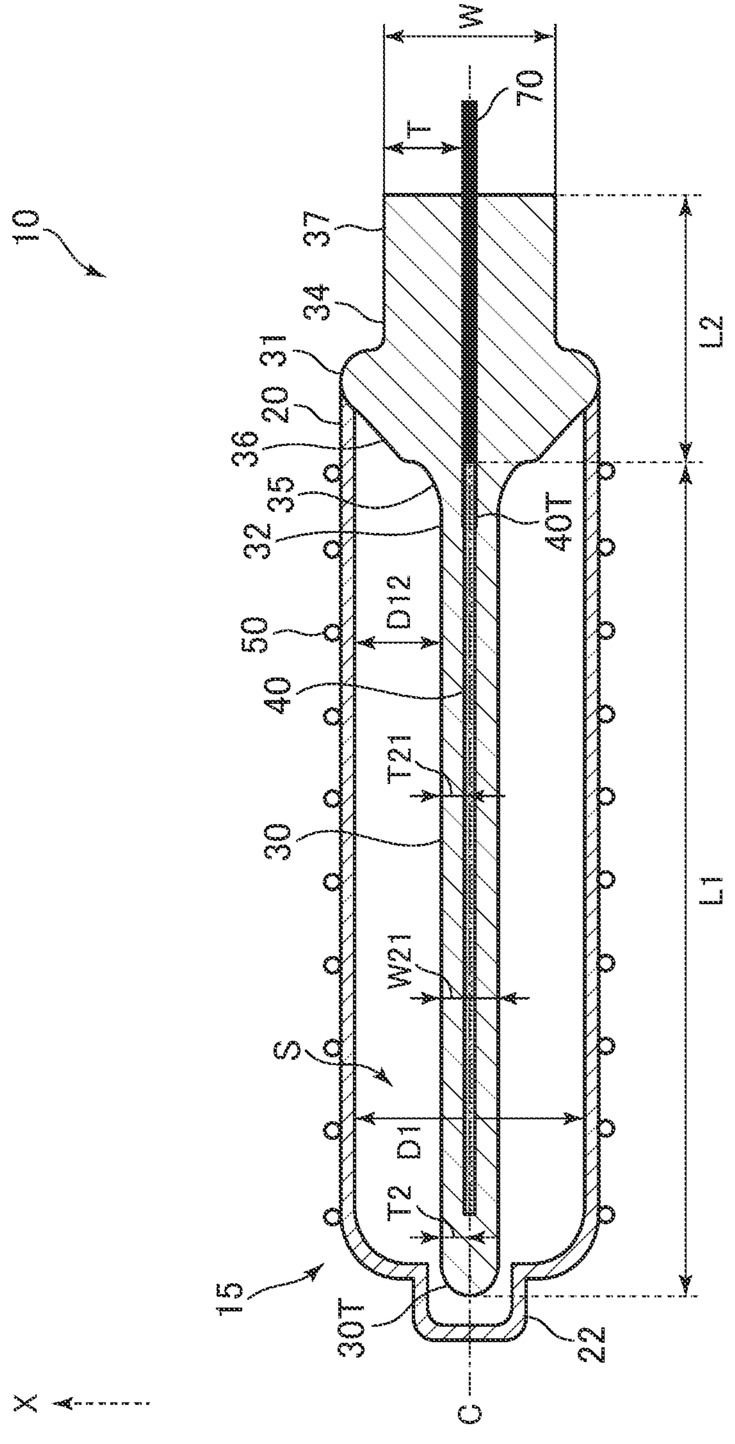
FIG. 3 is a cross-sectional view of the excimer lamp shown in FIG. 2 rotated 90 degrees.

FIG. 2 is a cross-sectional view of the excimer lamp 10 seen from one side of the lamp. FIG. 3 is a cross-sectional view of the excimer lamp 10 rotated 90 degrees from that shown in FIG. 2.

The excimer lamp 10 is equipped with a discharge tube 20. The discharge tube 20 has a circular cross-section and is composed of a dielectric material such as quartz glass. In the discharge tube 20, a dielectric 30 extends along the axis C of the discharge tube 20, i.e., the axis of the excimer lamp 10. The dielectric 30 has a flange 31 formed on its outer surface. The flange 31 is welded to the discharge tube 20 so that a cylindrical and sealed discharge space S is formed around the dielectric 30 arranged in the discharge tube 20. The excimer lamp 10 is configured as a dual-cylinder tubular-type excimer lamp, in which a discharge vessel 15 is formed by the discharge tube 20 and the dielectric 30. A noble or mixing gas is enclosed in the discharge space S as a discharge gas.

A singular band-shaped foil electrode (hereinafter, called "inner electrode") 40 extends along the axis C and is covered with the pillar dielectric 30. Herein, the inner electrode 40 is embedded in the dielectric 30 such that the inner electrode 40 is not exposed to the discharge space S. An end portion 40T of the inner electrode 40 connects with a power supply rod or wire 70, which connects to a power cable 72 shown in FIG. 1. In the discharge tube 20, a protrusion (hereinafter, "exhaust tube") 22 is formed at an end portion of the discharge tube 20.

The inner electrode 40 is coaxial to the dielectric 30 so that the center position along both the width direction and the thickness direction is aligned with the center position of the dielectric 30. Also, the dielectric 30 is coaxial to the discharge tube 20. Therefore, the inner electrode 40 is substantially coaxial to the discharge tube 20 and symmetrical with respect to the axis C of the discharge tube 20. Herein, direction X is defined as the thickness direction of the inner electrode 40 and direction Y is defined as the width direction of the inner electrode 40 perpendicular to the X direction.

FIG. 2 shows the cross-sectional view along the Y direction. FIG. 3 shows the cross-sectional view along the X direction.

An electrode 50 (hereinafter, "outer electrode") is provided on the outer surface of the discharge tube 20. The outer electrode 50 is herein a metal wire wound around the outer surface of the discharge tube 20 spirally at a given pitch.

The polarities of the inner electrode 40 and the outer electrode 50 are herein set to an anode and a cathode, respectively. Then, a high frequency (for example, a frequency within the range of several kilohertz to a dozen kilohertz) and a high voltage (for example, a voltage within the range of several kilovolts to a dozen kilovolts) is supplied to the inner electrode 40 and the outer electrode 50. Consequently, a dielectric barrier discharge occurs between the inner electrode 40 and the outer electrode 50, and excimer light (ultraviolet light) having a specific spectrum (e.g., 172 nm) is emitted from the discharge space S.

The excimer lamp 10 according to the first embodiment is a micro excimer lamp that is miniaturized or downsized. For example, the length of the discharge generation section along the axis C, i.e., emission length in the discharge tube 20, may be set to a range between 20-400 mm. The outer diameter of the discharge tube 20 may be set to a range between 5-30 mm, preferably between 8-25 mm.

To prevent the discharge tube 20 from degrading due to excimer light emission and suppress an increase in voltage for starting discharge, the thickness of the discharge tube 20 may be set to a range between 0.8-1.5 mm. As for the inner diameter of the discharge tube 20, to prevent the excimer lamp 10 from experiencing either unstable discharge due to a long discharge distance or shortage of illumination due to a short discharge distance, the inner diameter may be set to a range between 4-28 mm, preferably between 6-23 mm.

The discharge distance in the discharge tube 20, i.e., a distance between the dielectric 30 and the inner surface of the discharge tube 20 may be set to a range between 2-12 mm, and preferably between 3-10 mm to prevent the excimer lamp 10 from experiencing either a shortage of illumination due to a limited discharge space or unstable discharge due to an excessive discharge distance.

As described above, the inner electrode 40 is an ultra-thin, band-shaped foil electrode. The thickness of the inner electrode 40 is suppressed relative to the width of the inner electrode 40. Herein, the ratio of the thickness to the width of the inner electrode 40 is less than or equal to 1/30, preferably 1/50, and more preferably 1/100. Note that the dimensions of the inner electrode 40 in FIGS. 2 and 3 are not drawn to scale.

For example, the thickness of the inner electrode 40 is set to a range between 20-50 μm in view of current capacity and ease of manufacturing. The width of the inner electrode is set to a range between 1.2-10 mm in view of the current capacity and ease of manufacturing, and furthermore to prevent a shield of discharge light caused by an oversized electrode.

The thickness of the inner electrode 40 may be set in accordance to the inner diameter D1 of the discharge tube 20 in view of uniformity of luminosity. For example, the ratio of the thickness of the inner electrode 40 to the inner diameter D1 is less than or equal to 1/200. The width of the inner electrode 40 may be set in accordance to the inner diameter D1 of the discharge tube 20 in view of the lighting responsiveness. For example, the ratio of the width of the inner electrode 40 to the inner diameter D1 is less than or equal to 1/2, preferably 1/4.

The inner electrode 40 may be formed by a high-conductive metal, an alloy, or materials easy to facilitate electrolytic polishing. Herein, molybdenum or an alloy including molybdenum, etc., is used.

The dielectric 30 is composed of a dielectric material such as $SiO_2$. The thickness of the dielectric 30 may be set to 0.1-2 mm in view of a limitation needed to maintain its electrical non-conductance property and prevent a surge in voltage when a discharge commences.

Figure 4:
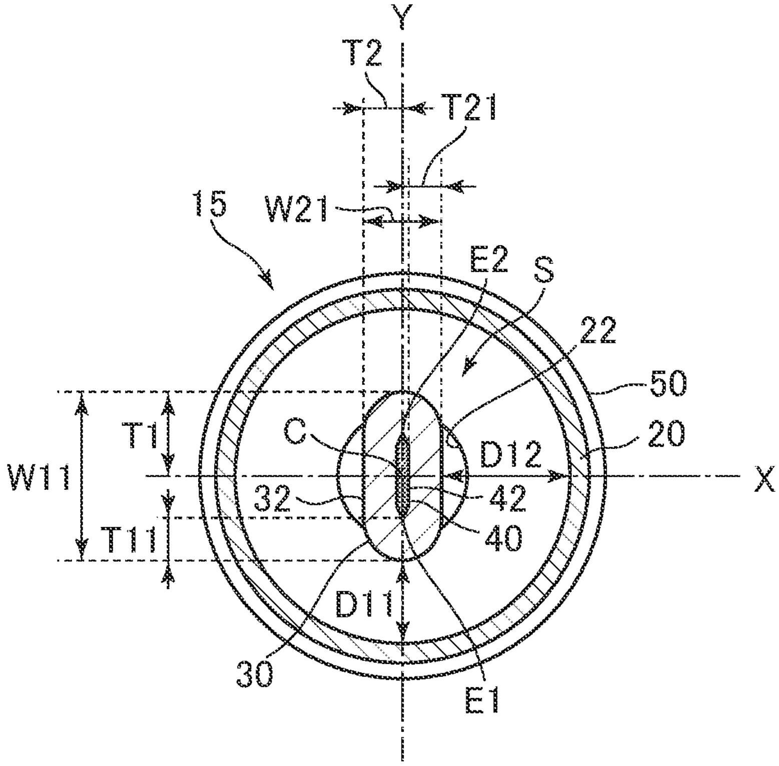
FIG. 4 is a cross-sectional view of the excimer lamp at the IV-IV line shown in FIG. 2.

FIG. 4 is a cross-sectional view at the IV-IV line shown in FIG. 2.

As described later, the inner electrode 40 is flattened between both edge portions along the width direction, i.e., Y direction, whereas the edge portions of the inner electrode 40 are sharply pointed along the Y direction.

As shown in FIG. 2, the dielectric 30 has a relatively small-sized portion 32 that covers the inner electrode 40 (hereinafter, "small-diameter portion") and relatively large-sized portion 34 that covers the power supply rod, power supply cord, or power supply wire 70 with the flange 31 on its outer surface (hereinafter, "large-diameter portion"). The small-diameter portion 32 is coaxial to the discharge tube 20.

In the small-diameter portion 32, the profile on the X-Y plane is not circular (See FIG. 4). The dielectric 30 has an oval profile over the small-diameter portion 32.

Figure 5:
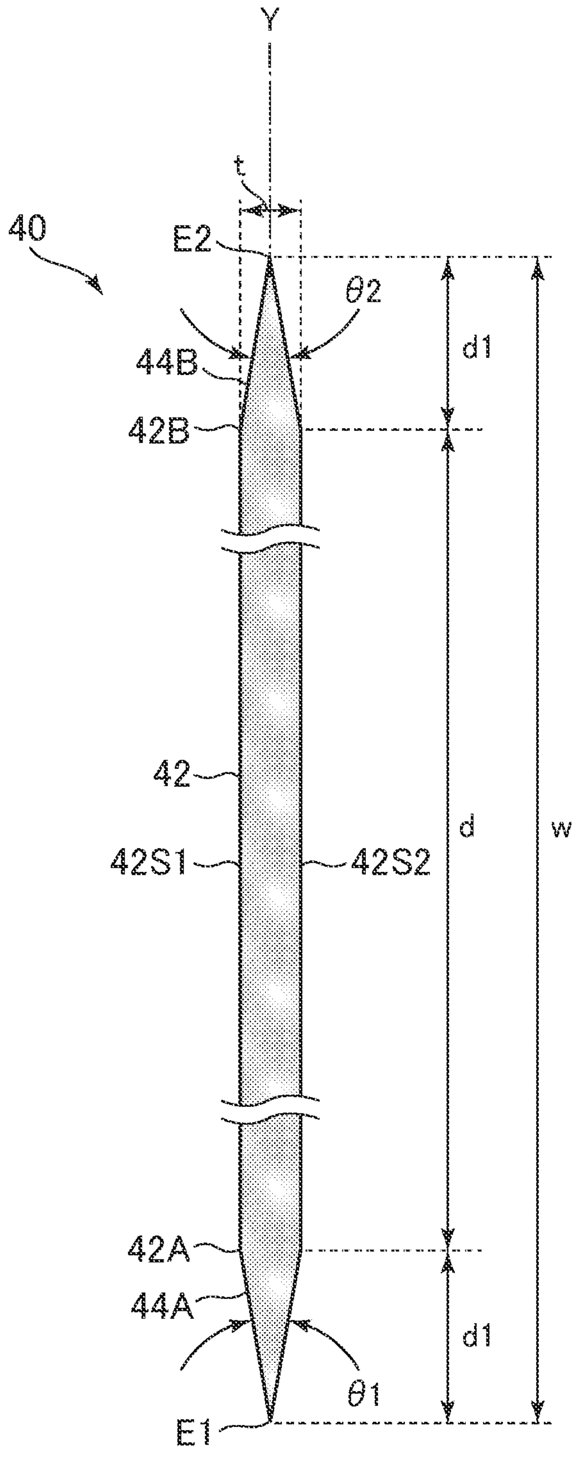
FIG. 5 is cross-sectional view of an inner electrode.
Figure 6:
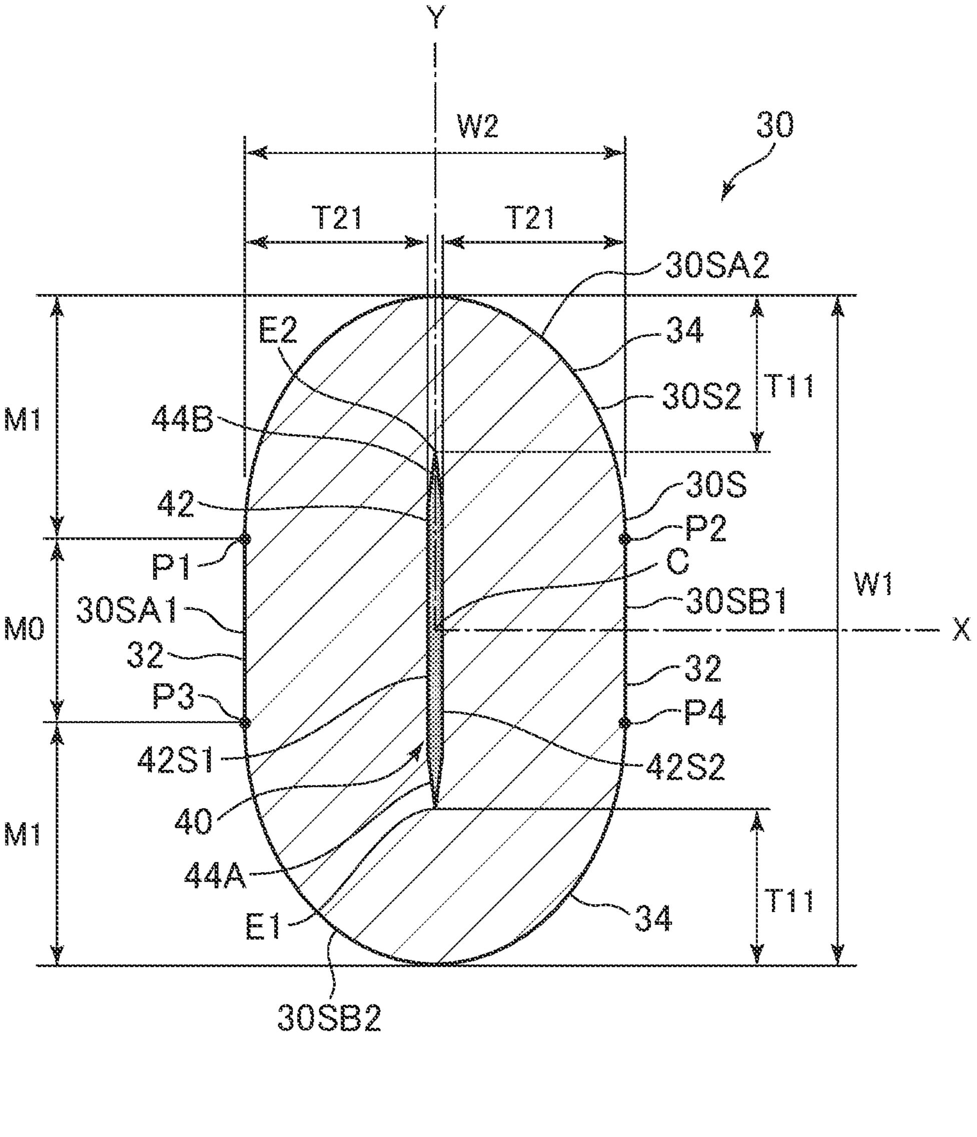
FIG. 6 is a cross-sectional view of a dielectric.

FIG. 5 is a cross-sectional view of the inner electrode 40. FIG. 6 is a cross-sectional view of the dielectric 30 covering the inner electrode 40.

As described above, the inner electrode 40 is extremely thin foil electrode with a ratio of the thickness "t" to the width "w" less than or equal to 1/30. The inner electrode 40 has a flattened portion or segment 42 with thickness "t" and wedge-shaped edge portions 42A and 42B.

The thickness "t" of the flattened segment 42 along the Y direction is generally constant. Note that the degree of the flatness of the flattened segment 42 does not require a strict and severe flatness. Herein, the differences in thickness at different positions are permitted to some extent when observing the cross section of the inner electrode 40 microscopically. For example, the thickness "t" of the flattened segment 42 may be regarded as constant when the thickness of an arbitrary position along the Y direction is equal to or greater than 0.7 of the maximum of the thickness of the flattened segment 42. Preferably, the thickness of an arbitrary position along the Y direction is greater than 0.8. Such differences in the thickness are herein permitted.

The inner electrode 40 consists of the flattened portion 42 and the edge portions 44A and 44B. Herein, the ratio of the length "d" of the flattened segment 42 to the width "w" of the inner electrode 40 along the Y direction is greater than or equal to 0.9. Note that, the ratio (d/w) may be greater than or equal to 0.6. Accordingly, the ratio of the individual length "d1" of edge portion 44A and edge portion 44B to the width "w" of the inner electrode 40 along the Y direction may be less than or equal to 0.2. Herein, the ratio (d1/w) is less than or equal to 0.05.

The edge portions 44A and 44B are sharpened and pointed. The tips E1 and E2 of the edge portions 44A and 44B, respectively, have no meaningful thickness and are regarded as points. Note that tips E1 and E2 are recognized visually as "points" when observing the cross-section of the inner electrode 40 microscopically.

The inner electrode 40 is arranged such that the central position of the flattened segment 42 along the Y direction is aligned with the axis C. The wedge-shaped edge portions 44A and 44B taper from a boundary of the flattened segment 42 towards the tips E1 and E2, respectively. A tapered angle "θ1" of the edge portion 44A and a tapered angle "θ2" of the edge portion 44B are constant, i.e., the surfaces of the edge portions 44A and 44B are flat surfaces. The wedge-shaped edge portions 44A and 44B are straightly tapered and each has a symmetrical V-shape in the Y direction. The pointed edge portions 44A and 44B are formed on the inner electrode 40 along the axis C. Herein, the edge portions 44A and 44B are symmetrical with respect to the X and Y directions.

The tapered angles "θ1" and "θ2" (herein, 01=02) are set to a range between 2-15 degrees, preferably between 2-10 degrees. The tapered angles or narrow angles θ1 and θ2 are set based on (1) the prevention of peeling between the inner electrode 40 and the dielectric 30; (2) the current capacity depending upon the cross-sectional area of the flattened segment 42; and (3) the suppression of a rise in temperature caused by thermal energy (heat). Note that the tapered angles "θ1" and "θ2" may be measured by microscopically observing positions 100 μm apart from the tips E1 and E2 on the cross-section.

The shape of the inner electrode 40 described above allows the micro excimer lamp 10 to exhibit superior lighting responsiveness while suppressing peeling of the inner electrode 40 from the dielectric 30 by close contact between the dielectric 30 and the inner electrode 40.

Namely, since the flattened segment 42 having the constant thickness "t" represents most of the inner electrode 40, the inner electrode 40 may contact tightly with the dielectric 30 via the side surfaces 42S1 and 42S2 that are opposite and parallel to one another.

Furthermore, the cross-sectional area of the inner electrode 40 becomes a relatively large cross-sectional area by the linear side surfaces 42S1 and 422, despite the extremely thin foil electrode. Enlargement of the inner electrode 40 along the thickness direction (X direction) is not needed. Thus, only a low amount of thermal energy (heat) is generated as electric current flows into the inner electrode while the excimer lamp 10 is turned ON, which suppresses thermal expansion along the thickness direction (X direction) and the width direction (Y direction).

On the other hand, since the edge portions 44A and 44B are sharply pointed, there isn't any space at the boundary between the edge portions 44A and 44B and the flattened segment 42, which suppresses peeling between the inner electrode 40 and the dielectric 30. Especially, since the wedge-shaped edge portions 44A and 44B taper toward the points E1 and E2 with constant taper angles θ1 and θ2, i.e., the surfaces of the edge portions 44A and 44B are planar, peeling between the edge portions 44A and 44B and the dielectric 30 is suppressed and electrolytic polishing of the edge portions 44A and 44B is simplified. Such polishing allows the suppression of peeling between the dielectric 30 and the inner electrode 40.

Electric field concentration occurs at the tips E1 and E2 of edge portions 44A and 44B, which are sharply pointed and extend linearly along the axis C. Since the inner electrode 40 is coaxial to the dielectric 30 and the discharge tube 20, ultraviolet light is emitted from the circumference of the discharge tube 20, while suppressing a surge in voltage at the start of discharge.

FIG. 6 is an enlarged cross-sectional view of the dielectric 30 covering the inner electrode 40 shown in FIG. 4. Herein, the profile of the small-diameter portion 32 is shown.

As described above, the dielectric 30 has a oblateness and the profile is oval in accordance to the cross-sectional geometry and arrangement of the inner electrode 40. The dielectric 30 includes curved surfaces 34 that encompass the edge portions 44A and 44B of the inner electrode 40 and flat surfaces 32 between the curved surfaces 34. The profile of the dielectric 30 is symmetrical with respect to the Y direction.

The outline of the cross-sectional view of the dielectric 30 is herein formed by connecting a pair of linear lines 30SA1 and 30SB1 with a pair of semi-ellipse lines 30SA2 and 30SB2.

The linear lines 30SA1 and 30SB1 are opposite to one another along the Y direction and face the surfaces 42S1 and 42S2 of the inner electrode 40, respectively. As shown in FIG. 6, the boundaries of the semi-ellipse lines 30SA2 and 30SB2 and the linear lines 30SA1 and 30SB1 are designated as cited references "P1, P2, P3, and P4."

In FIG. 6, the profile of the dielectric 30 is divided into three sections along the Y direction. These sections are defined in accordance to the boundaries P1, P2, P3, and P4. The flat surfaces 32 of the dielectric 40 are formed in accordance to the section M0. The opposite flat surfaces 32 corresponding to the linear lines 30SA1 and 30SB1 are generally flat along the Y direction. The curved surfaces 34 are formed in accordance to two sections labeled M1. The curved surfaces 34 corresponding to the semi-ellipse lines 30SA2 and 30SB2 are symmetrical with respect to the Y direction.

The tips E1 and E2 of the inner electrode 40 are positioned near the curved surfaces 34 and the curved surfaces 34 encompass the tips E1 and E2. The boundaries P1, P2, P3 and P4 are preferably positioned in a range between the tips E1 and E2 along the Y direction. Herein, the boundaries P1, P2, P3 and P4 are in a range between both ends 42A and 42B of the flattened segment 42 shown in FIG. 5.

The oval profile of the dielectric 30 along the Y direction is like the outline of the sectional view of the inner electrode 40 that extends along the Y direction. A distance T11 between the dielectric 30 and the inner electrode 40 along the Y direction does not vary relatively much from a distance T21 between the dielectric 30 and the inner electrode 40 along the X direction, compared to a dielectric that has the circular cross-section.

The profile of the dielectric 30 may be defined to comply with the following formulas. Note that W1 represents the width of dielectric 30 along the Y direction and W2 represents the width of the dielectric 30 along the X direction.

$$W2 < W1 \quad (1)$$

$$T21 > T11 \quad (2)$$

When an excimer discharge occurs in the discharge tube 20, the electric field strength near the tips E1 and E2 is not excessively high, and the generated discharge expands along the surface of the dielectric 30 from the area adjacent to the tips E1 and E2 of the inner electrode 40. The oval profile of the dielectric 30 suppresses an occurrence of a biased discharge. On the other hand, the formation of the flattened segment 42 of the inner electrode 40 between the boundaries P1, P2, P3, and P4 allows excellent lighting responsiveness to be maintained consistently.

The oval profile of the dielectric 30 suppresses a degradation of luminosity. Namely, since the opposite linear lines 30SA1 and 30SB1 face the flattened segment 42 of the inner electrode 40 along the Y direction, the distance T21 is relatively short compared to a distance when the dielectric 30 has a circular instead of oval profile. Consequently, distributions of luminosity along the Y direction are totally uniform, and any degradation of luminosity adjacent to the central portion along the Y direction can be suppressed.

Furthermore, since the curvature of the outer surfaces 34 changes gradually around the tips E1 and E2 of the inner electrode 40, cracks appearing adjacent to the boundaries P1, P2, P3, and P4 that are caused by a contraction of the dielectric 30 can also be suppressed. The dielectric 30 may have a profile other than that described above. For example, the dielectric 30 may have a profile that is semi-circular.

Whereas the dielectric 30 is oblate in its small-diameter portion 32 (See FIGS. 2 and 3), the profile of the large-diameter portion 34 is circular. The large-diameter portion 34 has an exposed section 36 and an extended portion or section 37. The exposed section 36 is exposed to the discharge space S. The extended section 37 extends beyond the discharge tube 20. The small-diameter portion 32 extends along the axis C in section L1 and opposite to the outer electrode 50. The large-diameter portion 34 extends along the axis C in section L2.

In the small-diameter portion 32, the thickness W11 in the Y direction is greater than the thickness W21 also in the Y direction since the small-diameter portion 32 is oblate. In the large-diameter portion 34, the thickness T and the diameter W of the extended portion 37 is generally constant. The small-diameter portion 32 smoothly connects with the large-diameter portion 34 at a connecting section 35. The exposed portion 36 tapers towards the center of the discharge tube 20 and has a curved surface. The discharge distance D11 in the Y direction (see FIG. 2) and the discharge distance D12 in the X direction (see FIG. 3) is relatively long compared to the distances T11 and T21 between the outer surface of the dielectric 30 and the inner electrode 40.

The small-diameter portion 32 extends along the axis C in section L1 and is opposite the outer electrode 50. Thus, a relatively large discharge space S is formed in the discharge tube 20. Consequently, lighting responsiveness is enhanced, and ultraviolet light is emitted effectively. The large-diameter portion 34 that supports the small-diameter portion 32 is welded to the discharge tube 20. Such a cantilever support provides stability for a dual-cylinder type discharge tube and mitigates damage to the excimer lamp 10. The curved surface of the tapered exposed section 36 is a smoothly and continuously curved surface that continues to the flange 31, which prevents creeping discharge from or adjacent to the connecting portion 40T of the inner electrode 40.

The excimer lamp 10 explained above can be manufactured by the following manufacturing process.

Firstly, a large-sized cylindrical glass tube (hereinafter, "gas sealing tube") corresponding to the large-diameter portion 34 is formed. A flange-shaped portion is formed at the same time. Also, a small-sized cylindrical glass tube (hereinafter, "electrode sealing tube") corresponding to the small-diameter portion 32 is formed. The gas sealing tube is welded to the electrode sealing tube coaxially to form a single tube (hereinafter, "welded tube") corresponding to the dielectric (interior tube) 30.

After a foil electrode is connected to a power supply rod or wire by resistance welding or the like, the foil electrode and the power supply rod or wire are inserted into the hollow portion formed in the electrode sealing tube and the gas sealing tube. Then, the welded tube is subjected to a vacuum process to seal the foil electrode and the power supply rod or wire in the welded tube. After the sealing process, the welded tube is subjected to a heat treatment process to tightly fasten the welded tube to the foil electrode and seal the foil electrode and the power supply rod or wire together in the welded tube.

In the heating process, the welded tube is rotated and heated by a gas burner or the like to produce an oval profile for the electrode sealing tube. For example, during the rotation of the welded tube, the welded tube is uniformly shrunk by heating until the point of the foil electrode reaches the hollow portion of the welded tube and is then shrunk along the thickness direction of the welded tube to form an oval profile. Note that a coating process for the welding tube may also be carried out.

On the other hand, a discharge tube composed of quartz glass or the like is formed with an exhaust outlet and insertion inlet. The welded tube is then inserted into the discharge tube and is welded to the discharge tube at the flange.

Furthermore, a vacuum drawing process is performed on the discharge tube via the exhaust outlet while heating the discharge tube to remove all impurities. Then, the exhaust outlet is sealed after enclosing a discharge gas and an outer electrode is arranged on the surface of the discharge tube.

In this embodiment, the dielectric 30 is oblate from one end to the other end. However, only part and not all of the dielectric 30 may be oblate.

Figure 7:
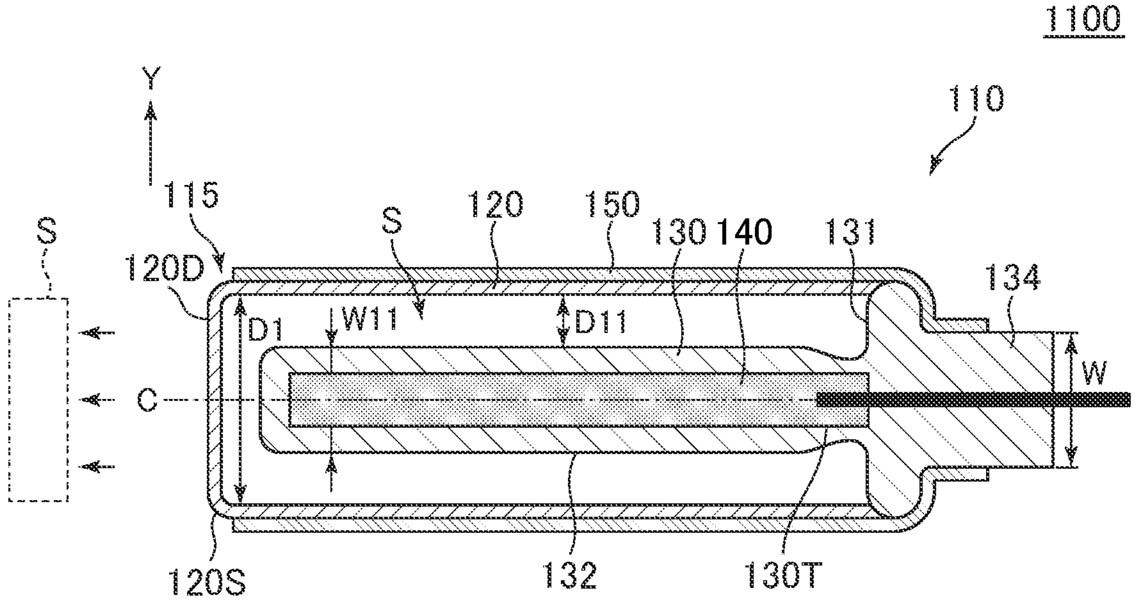
FIG. 7 is a cross-sectional view of an excimer lamp according to a second embodiment.
Figure 8:
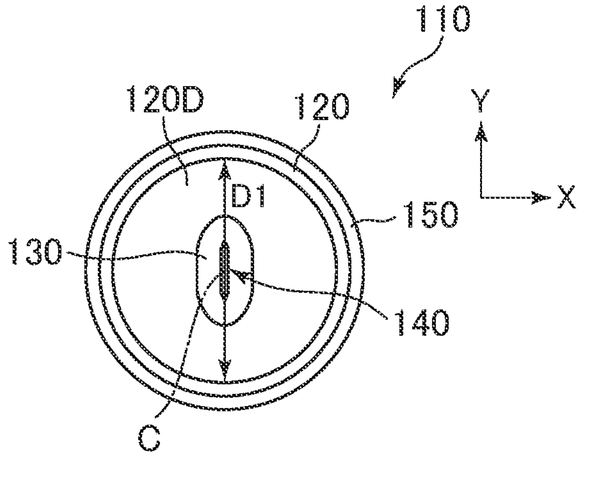
FIG. 8 is a plan view of the excimer lamp shown in FIG. 7 as seen from the front side of the lamp.

With reference to FIGS. 7 and 8, an excimer lamp according to the second embodiment is explained.

FIG. 7 is the cross-sectional view of the excimer lamp. FIG. 8 is a plan view of the excimer lamp seen from one end side.

The excimer lamp 110 is a spot-irradiation type micro excimer lamp. Herein, the excimer lamp 110 is incorporated into a UV irradiation unit 1100. The excimer lamp 110 is equipped with a discharge tube 120, a dielectric 130, an inner electrode 140 that is a foil electrode, and an outer electrode 150. The dielectric 130 is welded to the discharge tube 120 at a flange 131 to form a discharge space S and configure a discharge vessel 115. The discharge tube 120 has a window 120D formed on the surface at one end. The window 120W is provided for emitting ultraviolet light.

The outer electrode 150 is arranged on the outer surface 120S of the discharge tube 120. The outer electrode 150 is composed of a reflective material. The outer electrode 150 may be a reflective film, membrane, or plate with high thermal conductivity. Herein, the outer electrode 150 is composed of film (e.g., aluminum film) that reflects ultraviolet light including 172 nm. The outer electrode 150 covers the outer surface 120S of the discharge tube 120 except for the window 120D.

Light generated in the discharge tube 120 is directed toward the window 120D by reflection off the outer electrode 150 and by an optical-fiber-effect via the dielectric 130 and the discharge tube 120, after which the light is emitted from the window 120D. Consequently, an external object S opposite the window 120D is irradiated in a sterilization process or the like.

The oblately formed dielectric 130 enables the configuration of a relatively large discharge space S, similarly to the first embodiment. Thus, optical attenuation is suppressed as light reflected off the outer electrode 150 progresses towards the window 120D. This allows the excimer lamp 110 to have a long discharge tube along the axis C, which enhances a luminosity regardless of the size of the excimer lamp 110.

Figure 9:
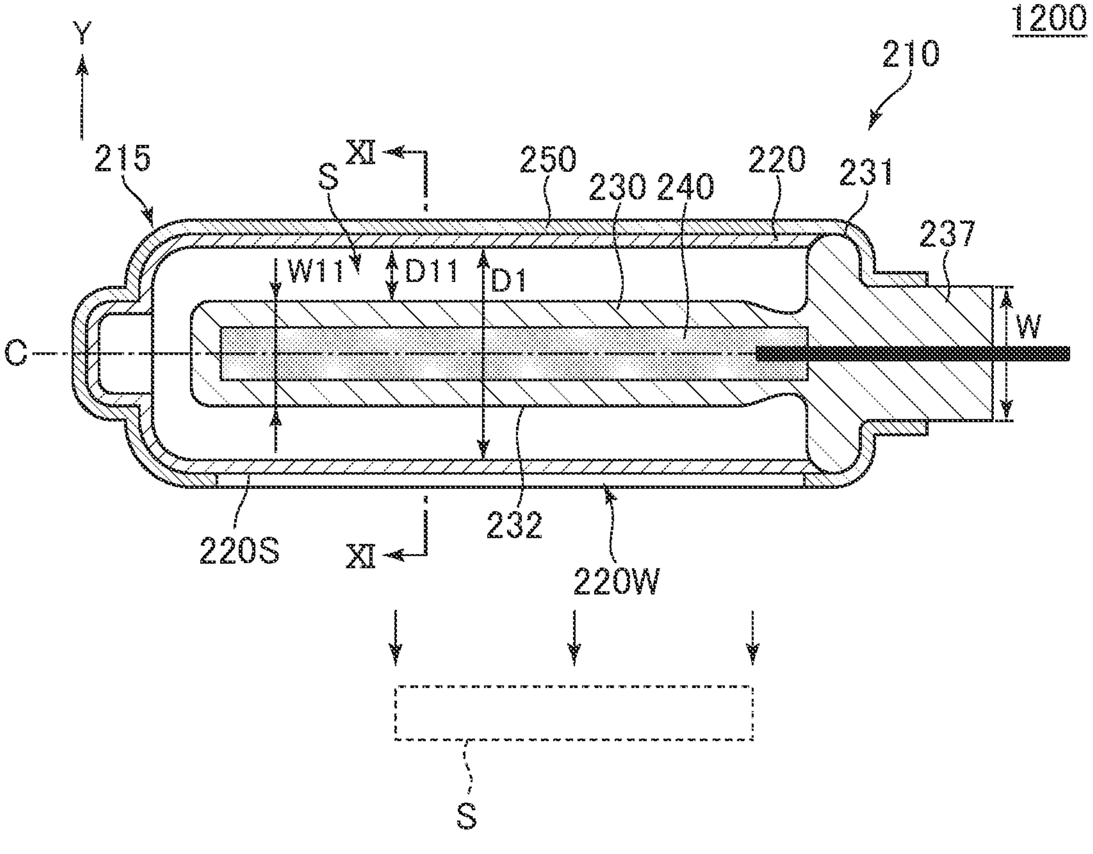
FIG. 9 is a cross-sectional view of an excimer lamp according to a third embodiment.
Figure 10:
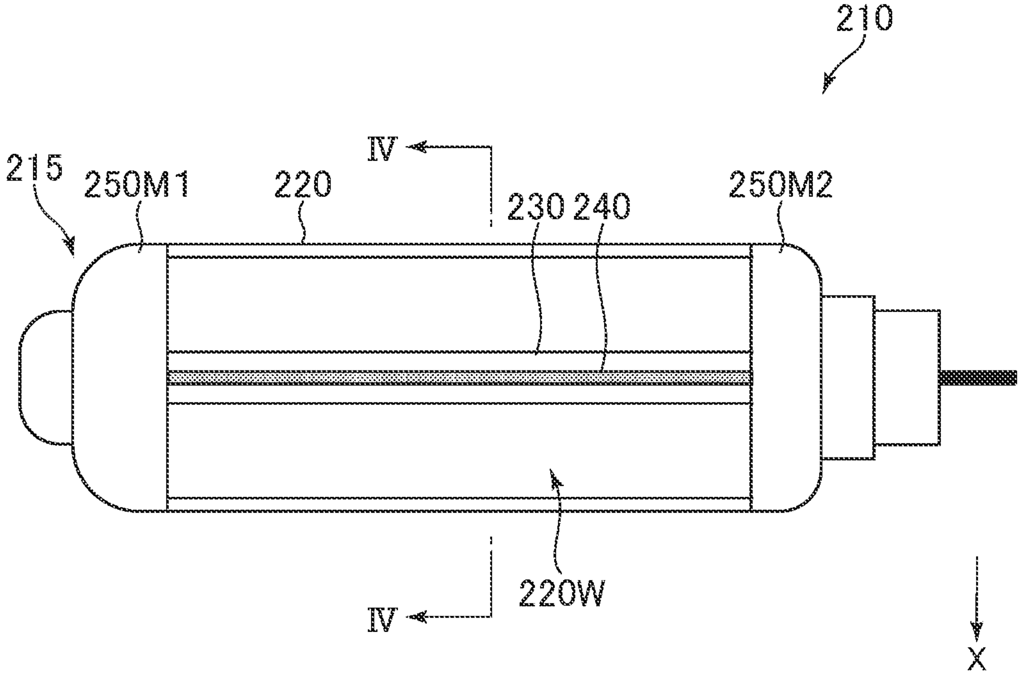
FIG. 10 is a plan view of the excimer lamp shown in FIG. 9 as seen from the bottom side of the lamp.
Figure 11:
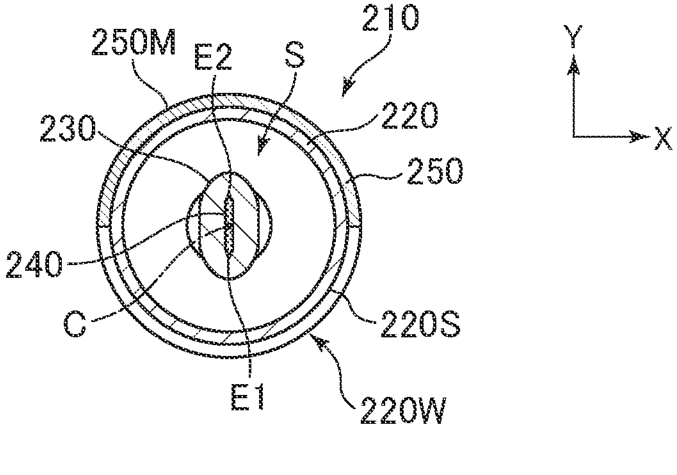
FIG. 11 is a cross-sectional view at the XI-XI line shown in FIG. 9.

With reference to FIGS. 9 to 11, the third embodiment is explained.

FIG. 9 is a cross-sectional view of an excimer lamp according to the third embodiment. FIG. 10 is a plan view of the excimer lamp as seen from the bottom side. FIG. 11 is a cross sectional view at the XI-XI line shown in FIG. 9.

The excimer lamp 210 is a line irradiation type lamp, which emits linear light along the axis C. Herein, the excimer lamp 210 is incorporated into a UV irradiation Unit 1200. The excimer lamp 210 is equipped with a discharge tube 220, a dielectric 230, an inner electrode 240, and an outer electrode 250.

The outer electrode 250 is arranged on the outer surface 220S of the discharge tube 220. Similarly to the second embodiment, the outer electrode 250 is composed of a reflective material such as aluminum film. The outer electrode 250 only partially covers the outer surface 220S of the discharge tube 220. ~~A~~ Part of the outer surface 220S remains uncovered by the outer electrode 250 to allow ultraviolet light to be transmitted outside. This transparent portion is formed as a window 220W, which has an arc-shaped cross-sectional profile and extends opposite the inner electrode 240 along the axis C. The ends of the window 220W along the axis C correspond to the ends of the inner electrode 240. Herein, the window 220W has an arc-shaped surface with a semicircular profile. The outer electrode 250 has cover segments 250M1 and 250M2 at both ends of the discharge tube 220, which cover the entire circumference of the discharge tube 220.

Ultraviolet light is emitted from the discharge tube 220 via the window 220W directly, or by reflection off the outer electrode 250. The emitted ultraviolet light irradiates an external object S arranged adjacent to the window 220W.

As shown in FIG. 11, the tip E1 of the inner electrode 240 is opposite to the window 220W and the other tip E2 is opposite to the outer electrode 250. Therefore, electric field concentration occurs at the tip E2 of the inner electrode 240, which allows a low level of voltage to generate a discharge. Excellent lighting responsiveness is maintained regardless of the size of the window 220W.

The dielectric 230 is symmetrical with respect to the width direction (Y direction) of the inner electrode 240. Thus, more ultraviolet light reflected off the outer electrode 250 progresses toward the window 220W without transmitting through or reflecting off the dielectric 230. Namely, light attenuation is suppressed, which increases the luminosity of the minimized excimer lamp 210.

Furthermore, the window 220W is symmetrical with respect to the Y direction, i.e., the width direction of the inner electrode 240. Thus, the distribution of light transmitted through the window 220W is uniform. The orientation of the tips E1 and E2 of the inner electrode 240 correspond to the intermediate position of the window 220W along the circumferential direction. The cross-sectional profile of the window 220W may be an arc other than a semicircle.

In the first to third embodiments, ultraviolet light is emitted from the discharge tube; however, visible light or fluorescent light may also be emitted from the discharge tube.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2023-047045 (filed on Mar. 23, 2023), No. 2023-047152 (filed on Mar. 23, 2023), No. 2023-047051 (filed on Mar. 23, 2023), No. 2023-118998 (filed on Jul. 21, 2023), and No. 2023-119080 (filed on Jul. 21, 2023), which are expressly incorporated herein by reference, in their entireties.

The invention claimed is:

1. An excimer lamp comprising:

a discharge tube;

a band-shaped foil electrode provided in said discharge tube, said foil electrode extending along the axis of said discharge tube; and a dielectric configured to cover said foil electrode and maintain close contact with said foil electrode, wherein opposite sides of said foil electrode being flattened along a width direction of said foil electrode, both edge portions of said foil electrode being pointed, said dielectric has an oval profile, such that a thickness of said dielectric in said width direction of said foil electrode is greater than a thickness of said dielectric in a direction orthogonal to said width direction of said foil electrode, and said dielectric includes at least two linear surfaces along said oval profile, opposite from each other, and both extending in said width direction of said foil electrode.

2. The excimer lamp according to claim 1, wherein both edges of said foil electrode are wedge-shaped.

3. The excimer lamp according to claim 1, wherein the profile has a pair of semi-ellipse or semi-circular outlines connecting with said pair of linear surfaces.

4. The excimer lamp according to claim 1, wherein the pair of linear surfaces is included in a range between both tips of said foil electrode in the cross-sectional view.

5. The excimer lamp according to claim 1, wherein said dielectric comprises a large-diameter portion and small-diameter portion, the diameter of said small-diameter portion being smaller than that of said large-diameter portion, said large-diameter portion having a flange welded to said discharge tube, said small-diameter portion extending into a discharge space formed by welding said discharge tube to the flange.

6. The excimer lamp according to claim 5, wherein said small-diameter portion covers said foil electrode over both ends.

7. The excimer lamp according to claim 5, wherein said large-diameter portion covers a power supply rod, code or wire configured to connect with said foil electrode.

8. The excimer lamp according to claim 1, wherein said discharge tube transmits excimer light to emit the excimer light radially.

9. The excimer lamp according to claim 1, wherein said discharge tube comprises a light-emission surface at one end of said discharge tube, excimer light being emitted from said discharge tube through said light-emission surface.

10. The excimer lamp according to claim 1, wherein said discharge tube comprises a linear light-emission surface on a part of the circumference and along the axis of said discharge tube, one edge of said foil electrode being opposite said linear light-emission surface.

11. The excimer lamp according to claim 2, wherein said discharge tube comprises a linear light-emission surface on a part of the circumference and along the axis of said discharge tube, one edge of said foil electrode being opposite said linear light-emission surface.

12. The excimer lamp according to claim 1, wherein said discharge tube comprises a linear light-emission surface on a part of the circumference and along the axis of said discharge tube, one edge of said foil electrode being opposite said linear light-emission surface.

13. The excimer lamp according to claim 3, wherein said discharge tube comprises a linear light-emission surface on a part of the circumference and along the axis of said discharge tube, one edge of said foil electrode being opposite said linear light-emission surface.

14. The excimer lamp according to claim 4, wherein said discharge tube comprises a linear light-emission surface on a part of the circumference and along the axis of said discharge tube, one edge of said foil electrode being opposite said linear light-emission surface.

15. The excimer lamp according to claim 5, wherein said discharge tube comprises a linear light-emission surface on a part of the circumference and along the axis of said discharge tube, one edge of said foil electrode being opposite said linear light-emission surface.

16. The excimer lamp according to claim 6, wherein said discharge tube comprises a linear light-emission surface on a part of the circumference and along the axis of said discharge tube, one edge of said foil electrode being opposite said linear light-emission surface.

17. The excimer lamp according to claim 7, wherein said discharge tube comprises a linear light-emission surface on a part of the circumference and along the axis of said discharge tube, one edge of said foil electrode being opposite said linear light-emission surface.

18. A UV (Ultraviolet) irradiation unit comprising:

an excimer lamp; and an electric power supplier configured to supply electric power to said excimer lamp, said excimer lamp comprising:

a discharge tube;

a band-shaped foil electrode provided in said discharge tube, said foil electrode extending along the axis of said discharge tube; and a dielectric configured to cover said foil electrode and maintain close contact with said foil electrode, wherein opposite sides of said foil electrode being flattened along a width direction of said foil electrode, both edge portions of said foil electrode being pointed, said dielectric has an oval profile, such that a thickness of said dielectric in said width direction of said foil electrode is greater than a thickness of said dielectric in a direction orthogonal to said width direction of said foil electrode, and said dielectric includes at least two linear surfaces along said oval profile, opposite from each other, and both extending in said width direction of said foil electrode.

* * * * *